S. POOLE.
MEAT-HOLDER.
No. 191,367. Patented May 29, 1877.
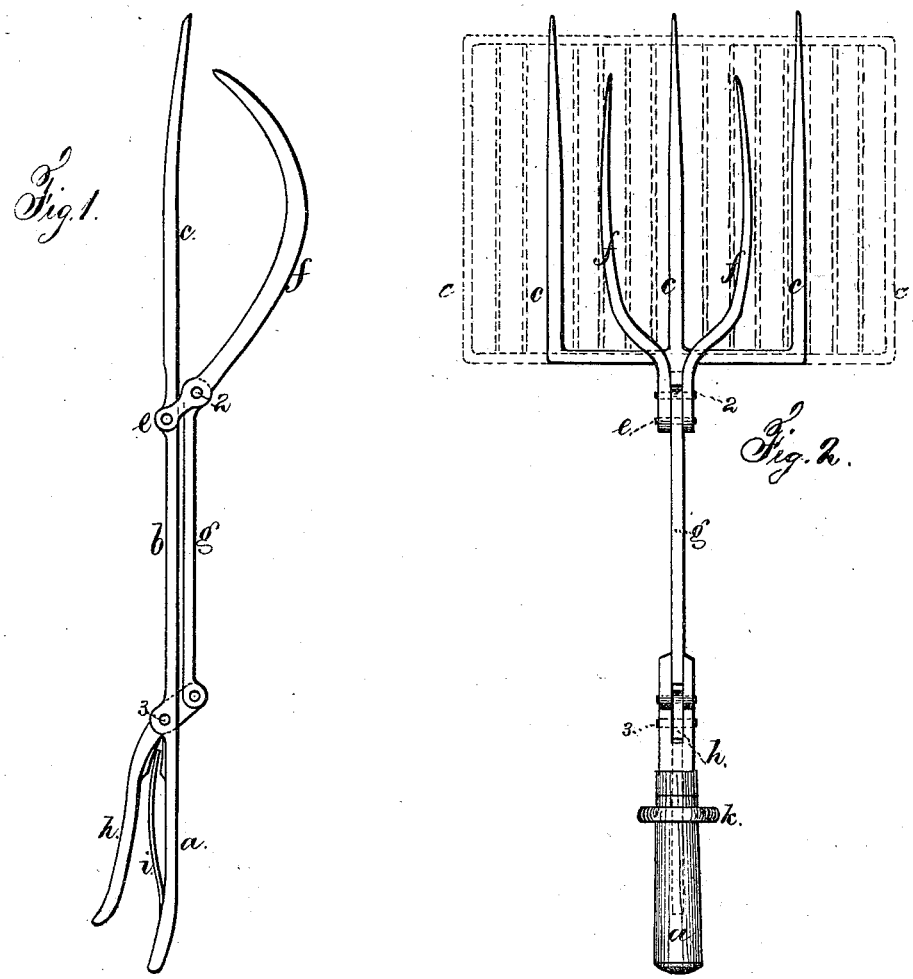
Witnesses
Harold Serrell
Chas. H. Smith
Inventor
Samuel Poole
per Lemuel W. Serrell
Atty.

UNITED STATES PATENT OFFICE.

SAMUEL POOLE, OF BROOKLYN, NEW YORK.

IMPROVEMENT IN MEAT-HOLDERS.

Specification forming part of Letters Patent No. 191,367, dated May 29, 1877; application filed May 3, 1877.

*To all whom it may concern:*

Be it known that I, SAMUEL POOLE, of Brooklyn, in the county of Kings and State of New York, have invented an Improvement in Meat Forks or Holders, of which the following is a specification:

This implement is especially intended for the use of butchers and cooks in handling pieces of meat, in lifting the same out of a pot or a brine-barrel, or for turning the meat around in a pan while cooking, or for holding the same over the fire while being broiled or cooked.

In the drawing, Figure 1 is a side view of the fork, and Fig. 2 is an edge view of the same.

The handle $a$ and shank or bar $b$ are either connected together or formed as one piece, and the prongs or holders $c$ at the outer end of the bar $b$ are preferably pointed, so as to be thrust into the meat. The swinging prongs or holders $f$ are hinged at $e$, and connected by the pivot 2 to the longitudinal bar $g$ that extends parallel, or nearly so, to the bar $b$, and is connected at the back end to the lever $h$ that passes through the bar $b$, and is pivoted at 3. This lever $h$ is of a bent shape, so as to close against one side of the handle. A spring, $i$, is preferably used to open the fork, and a ring, $k$, shown in Fig. 2, may be slipped back over the lever and handle to hold them together after the piece of meat or other material has been grasped between the prongs or holders by the closing of the lever toward the handle. This fork or holder is very convenient for cooks and butchers because the fork can be at a distance from the handle and the material is held without risk of slipping.

The holder portions $c$ and $f$ may be made flat and the outer ends united together in the form of frames, as shown by dotted lines in Fig. 2, and used for holding meat or other material while being cooked or broiled.

I claim as my invention—

The fork or holder made of the lever $h$, longitunal bar $g$, handle $a$, rod $b$, prongs or holders $c$, and swinging prongs or holders $f$, connected to the bar $g$, substantially as specified.

Signed by me this 2d day of May, A. D. 1877.

SAMUEL POOLE.

Witnesses:
GEO. T. PINCKNEY,
HAROLD SERRELL.